United States Patent Office 3,238,206
Patented Mar. 1, 1966

3,238,206
6-ALKANOYL; AND 6-ALPHA-HYDROXY-PTERIDINES
Irwin J. Pachter, Erdenheim, Pa., assignor to Smith Kline & French Laboratories, Philadelphia, Pa., a corporation of Pennsylvania
No Drawing. Filed Apr. 19, 1962, Ser. No. 188,847
7 Claims. (Cl. 260—251.5)

This invention relates to new pteridine compounds distinguished over the prior art by having an alkyl or aryl keto or hydroxymethylene moiety preferably substituted at the 6-position.

The compounds of this invention are represented by the following formula:

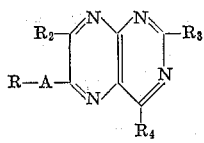

Formula I in which:

R represents an alkyl or aryl group of not more than 8 carbon atoms for example phenyl, thienyl, cyclohexyl, cyclopentyl or preferably alkanyl such as methyl or ethyl;
$R_2$ is amino;
$R_3$ and $R_4$ are hydrogen, methyl, phenyl, piperidyl, dimethylamino, methylthio or preferably amino; and
A is carbonyl or preferably hydroxymethylene.

The compounds in which $R_3$ and $R_4$ are methylthio are primarily useful as intermediates to prepare the amino congeners. The compounds in which A is carbonyl

are also primarily of utility as intermediates to prepare the hydroxymethylene and other congeners, however certain carbonyl derivatives have exceptional diuretic activity such as 6-acetyl-4,7-diaminopteridine.

The nontoxic, pharmaceutically acceptable acid addition salts of these pteridines are also equally useful such as the hydrochloride, acetate, sulfate etc. salts. The N-acylated derivatives such as the N-acetyl or N-carbamyl derivatives are equally of use.

The compounds of this invention, especially those in which $R_3$ and $R_4$ are amine functions, have been found to have diuretic and antihypertensive activity. Also the compounds of this invention have utility as antagonists of various microorganisms or enzyme systems such as antifolic acid activity. Also the compounds of this invention have utility as intermediates for preparing other heterocyclic derivatives having similar activity by methods known to the art. The aminopteridines of this invention have potentialities as dyes or dye intermediates.

It will be noted that the compounds in which A is hydroxymethylene will contain an asymmetric carbon atom. All isomers are also included in this invention. Also derivatives of the hydroxy congeners such as esters for example acetate, carbonate etc. or of the keto compounds such as hydrazones etc. can be easily prepared by methods well known to the art and are included.

The compounds of this invention are prepared by methods using readily available starting materials as discussed hereafter. The keto congeners, those in which A is carbonyl, are prepared by reacting the known 2,4,6-trisubstituted-5-nitrosopyrimidines with a compound of the formula

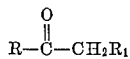

in which R is as defined and $R_1$ is a cyano or pyridinium moiety. The pyridinium compounds are generally prepared by reacting the α-halo acyl compound

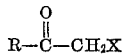

in which X is chlorine or bromine with an excess of a pyridine derivative. The acetonitrile starting materials are all well known.

When $R_1$ is cyano, an alkaline condensing agent is present such as an alkali metal alkoxide, carboxylate, or preferably cyanide. The sodium and potassium salts are preferred. When $R_1$ is pyridinium, the condensing agent is an alkali metal cyanide. The reaction is most conveniently carried out by warming the reactants in a solvent in which they are substantially soluble preferably the common lower alcoholic solvents such as ethanol, methanol or isopropanol or aqueous mixtures thereof. The heating may be up to the reflux temperature of the mixture for from about 10 minutes to 12 hours depending largely on the reactivity of the nitroso pyrimidine.

The pyrimidine starting material in which for example a 2-amino substituent is present react by standard condensation with great difficulty. These compounds are best prepared by a novel method which will be the subject of another application, namely, using the N-acylated triamino nitrosopyrimidine, preferably the diacetyl derivative. Reaction under the conditions described above then proceeds with good yield. The acyl groups are easily removed after condensation by alkali treatment.

The preferred hydroxy congeners of Formula I are prepared by reduction of their keto congeners usually by a bimetallic hydride reducing agent, preferably sodium borohydride. The reaction is carried out in solution in a common lower alcoholic solvent such as methanol or aqueous mixtures thereof often at ambient temperature or with slight warming for up to several hours.

The practice of this invention is obvious to those skilled in the art from the description above. Other variations will also be obvious. The invention claimed is characterized by compounds having a pteridine nucleus essentially substituted by a 6-alkyl or aryl carbonyl or, preferably a 6-alkyl or aryl hydroxymethylene moiety together with a 7-amino substituent. The following examples will fully illustrate the preparation of the compounds of this invention.

*Example 1*

A mixture of 10 g. of 5-nitroso-2,4,6-triamino-pyrimidine, 50 ml. of acetic anhydride and 100 ml. of glacial acetic acid is warmed slowly on a hot plate with stirring until all the starting material is in solution. The acetylated material begins to separate from the hot solution which is then cooled rapidly to stop acetylation. 4,6-Diacetamido-2-amino-5-nitrosopyrimidine is obtained by filtration and washing of the collected solid with ethanol.

A mixture of 8.7 g. (0.06 mole) of benzoylacetonitrile, 6.0 g. of potassium acetate and 100 ml. of absolute ethanol is added to 9.6 g. (0.04 mole) of the diacetyl compound in 150 ml. of boiling absolute ethanol. The mixture is heated at reflux until the blue diacetyl compound has completely reacted, then concentrated to 100 ml. Filtration gives 10.4 g. of yellow granular material which is the acetylated pteridine. This material is allowed to stand in suspension in 1% sodium hydroxide solution at room temperature for 8 hours. After neutralization with dilute acetic acid, the mixture is cooled and filtered to give 6-benzoyl-2,4,7-triaminopteridine, M.P. 338–339° C. (dec.) after purification.

*Example 2*

A mixure of 21.5 g. (10.1 mole) of 2,6-diamino-5-nitroso-2-phenylpyrimidine, 20.6 g. (0.12 mole) of acetonylpyridinium chloride and 200 ml. of ethanol is warmed while a solution of 2.5 g. (0.15 mole) of sodium cyanide in 50 ml. of water is added. After cooking for 80 minutes the mixture is cooled then filtered to give, after washing with water and recrystallization from dimethylformamide, a yellow solid, 6-acetyl-4,7-diamino-2-phenylpteridine, M.P. 305–310° C.

A sample (0.7 g) of the 6-acetyl compound is reacted with phenylhydrazine (1 ml.) in 80 ml. of acetic acid. Quenching and working up the mixture gives the phenylhydrazone, M.P. 306–308° C.

*Example 3*

A hot mixture of 8.0 g. of sodium cyanide, 16.8 g. of 4,6-diamino-2-methylthio-5-nitrosopyrimidine, 40 ml. of water and 160 ml. of ethanol is mixed with 26.0 g. of acetonylpyridinium chloride. Reaction is instantaneous. After cooling, filtration and washing, 6-acetyl-4,7-diamino-2-methylthiopteridine is obtained, M.P. >260° C. (dec.).

*Example 4*

A solution of 0.75 g. of sodium cyanide in 10 ml. of water is added in small portions to a boiling mixture of 1.4 g. of 4,6-diamino-2-nitrosopyrimidine, 2.5 g. of acetonylpyridinium chloride and 100 ml. of ethanol. After 30 minutes the mixture is cooled to separate yellow needles of 6-acetyl-4,7-diaminopteridine, M.P. >300° C.

*Example 5*

A mixture of 12.5 g. of 4,6-diamino-5-nitroso-2-phenylpyrimidine, 9.0 g. of sodium cyanide, 100 ml. of ethanol and 50 ml. of water is boiled as 12.5 g. of benzoylacetonitrile in 50 ml. of ethanol is added. After heating at reflux for 2 hours, cooling and working up as described gives 6-benzoyl-4,7-diamino-2-phenylpteridine, M.P. 327–328° C.

*Example 6*

Solutions of 0.7 g. of sodium cyanide in 5 ml. of water together with 2.7 g. of phenacylpyridinium bromide in 25 ml. of alcohol are added to 1.0 g. of 4,6-diamino-2-methyl-5-nitrosopyrimidine in 20 ml. of ethanol. After heating for 20 minutes, the solution is cooled and separated to give 6-benzoyl-4,7-diamino-2-methylpteridine, M.P. 307° C. (dec.).

*Example 7*

Similarly 5.49 g. of 4,6-diamino-2-methylthio-5-nitrosopyrimidine in 50 ml. of ethanol is reacted with 10.72 g. of phenacylpyridinium bromide in 150 ml. of 50% ethanol along with 5.0 g. of sodium cyanide in 10 ml. of water. After heating at reflux for 15 minutes working up gives 6-benzoyl-4,7-diamino-2-methylthiopteridine, M.P. 330–335° C. (dec.).

*Example 8*

Also 10.15 g. of benzoylacetonitrile, 3.5 g. of sodium cyanide and 7.0 g. of 4,6-diamino-5-nitrosopyrimidine in boiling aqueous ethanol is reacted and worked up as described to give 6-benzoyl-4,7-diaminopteridine, M.P. 291–293° C.

*Example 9*

A solution of 1.0 g. of sodium borohydride in 25 ml. of methanol is added to a mixture of 1.0 g. of 6-benzoyl-4,7-diaminopteridine (Example 8) in 50 ml. of methanol at 35° C. After heating carefully for 30 minutes and filtering, the solution is neutralized with ammonia. The volatiles are evaporated in vacuo. The residue is suspended in 30 ml. of water. After one hour, the solid is separated washed and dried to give a pale yellow solid, 4,7-diamino - 6 - (α-hydroxybenzyl)-pteridine, M.P. 224–225° C. from ethanol.

*Example 10*

A mixture of 1.0 g. of 6-acetyl-4,7-diaminopteridine (Example 4) in 50 ml. of methanol is reduced with 1.0 g. of sodium borohydride in methanol at 55–65° C. for 20–25 minutes. The filtered solution is neutralized with acetic acid, concentrated and worked up as described above to give 4,7-diamino-6-(α-hydroxyethyl)-pteridine, M.P. 240° C. (dec.).

*Example 11*

A mixture of 5.0 g. of 6-acetyl-4,7-diamino-2-phenylpteridine (Example 2) 5.0 g. of sodium borohydride and 200 ml. of methanol is reacted at ambient temperature (50° C.). Working up as described gives yellow plates of 4,7-diamino-6-(α - hydroxyethyl) - 2 - phenylpteridine, M.P. 274–276° C.

*Example 12*

A mixture of 5.0 g. of 4,7-diamino-6-benzoyl-2-methylthiopteridine (Example 7) and 150 ml. of piperidine is heated under reflux for 26 hours. After concentrating the mixture in vacuo, the residue is washed with ethanol, dried and recrystallized from dimethylformamide to give 6-benzoyl-4,7-diamino-2-N-piperidinopteridine, M.P. 300–301° C.

This material (500 mg.) is reduced with methanolic sodium borohydride (500 mg.) in ethanol as above to give 4,7 - diamino - 6-(α-hydroxybenzoyl)-2-N-piperidinopteridine.

*Example 13*

A mixture of 1.0 g. of 6-acetyl-4,7-diamino-2-methylthiopteridine (Example 3) and 50 ml. of piperidine is heated reflux for 24 hours. The excess piperidine is removed in vacuo. The residue is worked up as above to give red-orange needles of 6-acetyl-4,7-diamino-2-piperidinopteridine, M.P. 293–298° C. (dec.).

A mixture of 4.0 g. of this compound, 4.0 g. of sodium borohydride and 300 ml. of methanol is reacted at 40–45° C. The solution is worked up as described above to give 3.5 g. of yellow solid, 4,7-diamino-6-(α-hydroxyethyl)-2-N-piperidinopteridine, M.P. 226–227° C. from methanol.

*Example 14*

Substituting 2,6-diamino-4-dimethylamino-5-nitrosopyrimidine and cyclohexanoylacetonitrile in molar equivalents in Example 1 gave 6-cyclohexylcarbonyl-2,7-diamino-4-dimethylaminopteridine. Reduction with sodium borohydride then gives 6-(α-hydroxycyclohexylmethyl)-2,7-diamino-4-dimethylaminopteridine.

Substituting 1.2 g. of 6-benzoyl-2,4,7-triaminopteridine (Example 1) in Example 9 gives 2,4,7-triamino-6-(α-hydroxybenzyl)-pteridine.

Substituting molar equivalents of α-thienoylacetonitrile in Example 1 and Example 9 gives in succession 6-α-thienylcarbonyl - 2,4,7 - triaminopteridine and 2,4,7 - triamino-6-(α-hydroxythienylmethyl)-pteridine.

Substituting 2-butanonyl pyridinium chloride for acetonyl pyridinium chloride in Example 2 and reduction as described gives 6-propionyl-4,7-diamino-2-phenylpteridine and 4,7-diamino-2-phenyl-6-(α-hydroxypropyl)-pteridine.

What is claimed is:
1. A compound of the structure:

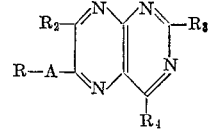

in which:

R is a member selected from the group consisting of alkyl having a maximum of 8 carbon atoms, phenyl, thienyl, cyclohexyl and cyclopentyl;
$R_2$ is amino;
$R_3$ and $R_4$ are members selected from the group consisting of amino, hydrogen, phenyl, methyl, N-piperidinyl, dimethylamino and methylthio; and
A is hydroxymethylene.

2. 2,4,7-triamino-6-(α-hydroxybenzyl)-pteridine.
3. 4,7-diamino-6-acetylpteridine.
4. 2,4,7-triamino-6-(α-hydroxyethyl)-pteridine.
5. 2,4,7-triamino-6-acetylpteridine.
6. 4,7-diamino-6-(α-hydroxybenzyl)-pteridine.
7. A compound of the structure:

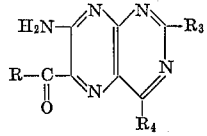

in which:

R is alkyl having a maximum of 8 carbon atoms; and
$R_3$ and $R_4$ are members selected from the group consisting of amino, hydrogen, phenyl, methyl, N-piperidinyl, dimethylamino and methylthio.

References Cited by the Examiner

UNITED STATES PATENTS 3,127,402  3/1964  Pachter et al. _____ 260—251.5

IRVING MARCUS, *Primary Examiner*.

DUVAL T. McCUTCHEN, NICHOLAS S. RIZZO,
*Examiners*.